UNITED STATES PATENT OFFICE.

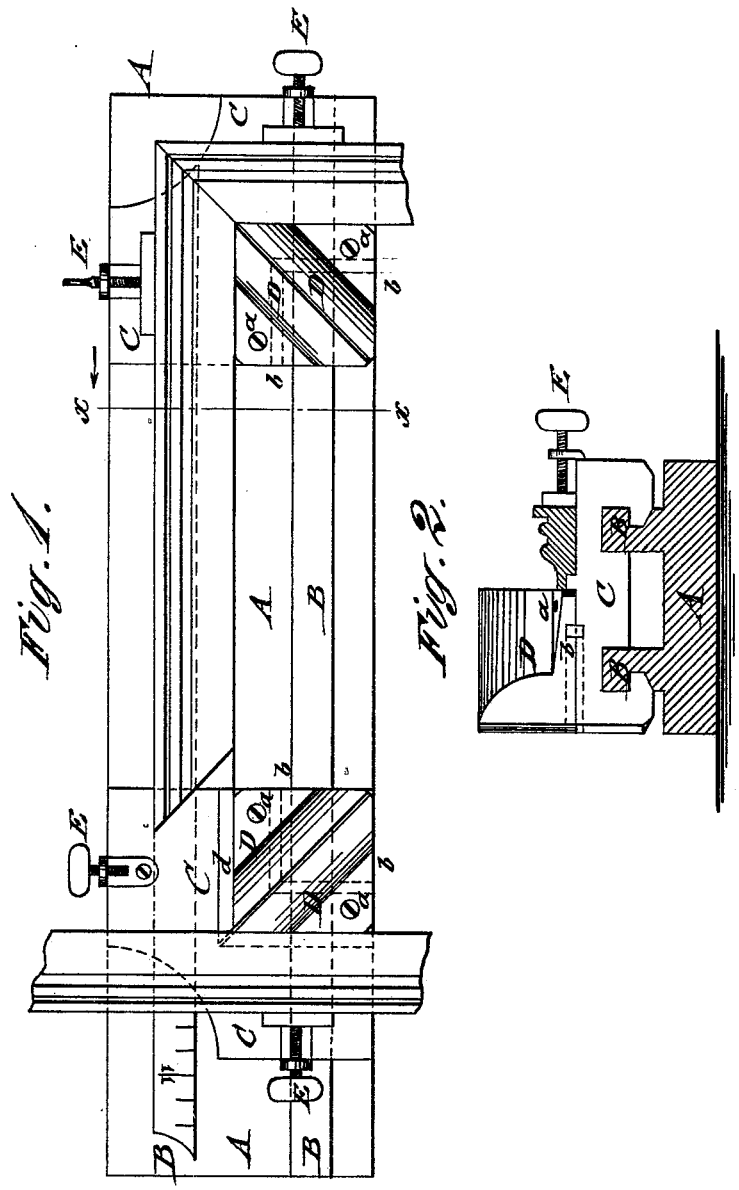

JOSIAH H. MOSHER AND JOHN PENNINGTON, OF PEWAMO, MICHIGAN.

IMPROVEMENT IN MITERING-MACHINES.

Specification forming part of Letters Patent No. 188,657, dated March 20, 1877; application filed January 29, 1877.

*To all whom it may concern:*

Be it known that we, JOSIAH H. MOSHER and JOHN PENNINGTON, of Pewamo, in the county of Ionia and State of Michigan, have invented an Improvement in Mitering-Machines, of which the following is a specification:

In the accompanying drawing, Figure 1 represents a top view, and Fig. 2 a vertical transverse section on line $x\,x$, Fig. 1, of our improved mitering-machine for joining picture-frames, moldings, &c.

Similar letters of reference indicate corresponding parts.

Our invention relates to an improved mitering-machine, for use in the manufacture of picture-frames, molded frames, and for the cutting and putting together of frames on any desired angle and length.

The invention consists of a base-piece with graduated guide-rails, carrying the sliding frame-supports, with adjustable saw-guides secured thereto.

In the drawing, A represents a base piece of suitable length, which carries, on grooved parallel guide-rails B, the sliding supports C, for the frame or molding. The sliding supports C are set for any length of molding or frame along one of the guide-rails, having a graduated scale, as shown in Fig. 1. The sliding supports C carry the adjustable saw-guides D, which are set by fastening clamp-screws $a$ along guides $b$ for any thickness of saw, or closer together when their adjoining sides are worn out by the saw. The sliding supports C have raised corner-strips $d$, against which the moldings are pressed by the clamp-screws E, that turn in posts attached to the supports.

The moldings are first cut at the required miter, and then brought to a perfect joint by running the saw through the joint of the moldings while they are firmly clamped together. The moldings are then fastened by glue and nails, and thereby two corners of the frame connected in an easy, quick, and effective manner. The mitering and jointing of frames and moldings is thus accomplished by a simple, accurate, and readily-operated device.

Having thus described our invention, we claim as new and desire to secure by Letters Patent—

The combination of the sliding supports C C, having adjustable saw-guides D D, and frame-clamping screws E, with the base A, provided with guide-rails B, as and for the purpose set forth.

JOSIAH H. MOSHER.
JOHN PENNINGTON.

Witnesses:
A. R. HICKS,
O. W. HOLLY.